(12) United States Patent
Kolesnikov

(10) Patent No.: US 8,683,204 B2
(45) Date of Patent: Mar. 25, 2014

(54) EFFICIENT TECHNIQUES FOR ACHIEVING SECURE TRANSACTIONS USING TAMPER-RESISTANT TOKENS

(75) Inventor: Vladimir Kolesnikov, Jersey City, NJ (US)

(73) Assignee: Alcatel Lucent, Paris (FR)

( * ) Notice: Subject to any disclaimer, the term of this patent is extended or adjusted under 35 U.S.C. 154(b) by 507 days.

(21) Appl. No.: 12/592,907

(22) Filed: Dec. 4, 2009

(65) Prior Publication Data

US 2011/0138184 A1     Jun. 9, 2011

(51) Int. Cl.
*H04L 29/06*          (2006.01)

(52) U.S. Cl.
USPC ............................................ 713/172; 713/159

(58) Field of Classification Search
USPC ........ 726/9, 20; 713/159, 170, 171, 172, 192; 380/44, 46
See application file for complete search history.

(56) References Cited

U.S. PATENT DOCUMENTS

| | | | |
|---|---|---|---|
| 5,717,756 A * | 2/1998 | Coleman ...................... | 713/155 |
| 7,231,526 B2 * | 6/2007 | Hon et al. ..................... | 713/185 |
| 2009/0323967 A1 * | 12/2009 | Peirce et al. .................. | 380/278 |

OTHER PUBLICATIONS

Kimmo Jarvinen et al.; Embedded SFE: Offloading Server and Network Using Hardware Tokens; Internet Citation; Dec. 4, 2009; p. 21PP; XP007917670; Retrieved from the Internet: url:http://eprint.iacr.org/cgi-bin/print.p1; retrieved on Mar. 16, 2011.
Yu Yu et al.; Security Utilizing External Computing Power; Information Technology: Coding and Computing, 2005; ITCC 2005 International Conference on Las Vegas, NV, USA Apr. 2005, Piscataway, NJ, USA; IEEE; vol. 1; Apr. 4, 2005; pp. 762-767; XP010795942.
Yehuda Lindell et al; A Proof of Yao's Protocol for Secure Two-Party Computation; Jul. 23, 2004; Retrieved from the Internet; Jul. 23, 2004; pp. 1-21; XP007917678; URL:http://eprint.iacr.org/cgi-bin/getfile.pl?entry=2004/175&version=20040723:201832&file=175.pdf.
Zuzana Beerliova-Trubiniova et al; MPC vs. SFE: Perfect Security in a Unified Corruption Model; Theory of Cryptography; Lecture Notes in Computer Science; Feb. 21, 2007; Springer Berlin Heidelberg, Berlin, Heidelberg, pp. 231-250; XP019087285; ISBN: 978-3-540-78523-1.

* cited by examiner

*Primary Examiner* — Edward Zee
(74) *Attorney, Agent, or Firm* — Carmen Patti Law Group, LLC

(57) ABSTRACT

An improved secure transaction system for facilitating secure transactions between devices in a network is set forth. The system includes a first device. A secure agent, adapted for encrypting and delivering a message on behalf of the first device, is provided. The secure agent has a secret key drawn at random from a large domain embedded in the agent by the first device. A second device, adapted to obtain the message, based on a session ID, from the secure agent, is provided. The second device can selectively test the truth of a corresponding message from the agent, based on querying of the first device. The testing is unknown and unpredictable to the secure agent during the transaction. In this manner, the first device and agent are kept separate to deter cheating.

11 Claims, 2 Drawing Sheets

EFFICIENT TECHNIQUES FOR ACHIEVING SECURE TRANSACTIONS USING TAMPER-RESISTANT TOKENS

TECHNICAL FIELD

This invention relates generally to a Secure Function Evaluation (SFE) system and method, and more particularly to a SFE system and method utilizing tamper-resistant tokens.

BACKGROUND

The roots of modern cryptography arose from the widespread availability of radio in wartime in the early part of the twentieth century. Specifically, modern cryptography extends beyond the early Spartan practice of using a scytale in wartime, a transposition ciphering tool. In modern times, given the mediums employed to send messages, interception and decoding problems must be addressed by the cryptographer. Modern day communications call for both privacy, such as by encryption of the message, and assurance of the source of the message. In fact it is paramount in modern day communications that we trust the source of information or communication.

SFE is a technique that enables mutually distrustful parties to evaluate a function on their inputs, such that, while the result is computed, the inputs remain private. Depending on the function, SFE may involve significant computational costs. SFE has become practical for many secure transaction applications due to the increase in computation and communication resources currently available for communication to both individuals and businesses. Types of transactions that can occur using SFE for security can include, for example, auctions, contract signing and distributed database mining to name a few.

Currently the use of SFE is limited due to the high costs of computation associated with the use of SFE algorithms.

Thus far, SFE has been accomplished using a variety of algorithms, including, for example, the Garbled Circuit (GC) algorithm, also known as Yao's Garbled Circuit. A server, such as P1, encrypts or garbles a computed function F represented by a Boolean circuit C, which can be blindly evaluated gate by gate. The results of C are sent directly to another server, such as P2. P2 then evaluates the GC under encryption, obtains the encrypted output of the GC and sends the encrypted output directly back to P1. Server P1 decrypts the output received from P2, and sends the decrypted output directly back to P2.

The GC can be constructed by P1 choosing two secrets for each wire of a circuit C he needs to garble. For each gate Gi, P1 creates and sends to P2 a garbled table Ti. Each garbled table created has the following property: given a set of garblings for the set of input wires of the corresponding gate, each table Ti generated based on the Gi allows to compute only the garbling of the corresponding output value. That is, P2 can only recover a single garbled output of each gate Gi from the table Ti and the garblings of the Gi's inputs. The tables Ti are usually implemented as a set of encryptions, where each pair of input garblings forming Gi serves as a key to the encryption of the corresponding output garbling Ti.

FIG. 1 is an example of a known, prior art GC, where, for an AND gate, T0 is represented by the following table:

$$T_0 = \begin{cases} t_{00} = Enc_{w_1^0}(Enc_{w_2^0}(w_0^0)) \\ t_{01} = Enc_{w_1^0}(Enc_{w_2^1}(w_0^0)) \\ t_{10} = Enc_{w_1^1}(Enc_{w_2^0}(w_0^0)) \\ t_{11} = Enc_{w_1^1}(Enc_{w_2^1}(w_0^1)) \end{cases}$$

The table T0 is received by P2 directly from P1; Further, e.g., given the input garblings w_1^0 and w_2^0, P2 attempts to decrypt each row of the table and recovers the encrypted output W0 of G0. Only one decryption will succeed from the decryption of the table T0, and will reveal the output wire secret W0. P2 then proceeds evaluating the entire garbled circuit as above, and eventually obtains the garbling of the output wire W. P2 then sends the garbling to P1 for decryption. P1 can decrypt the output and send directly back to P2. P2 never learns the values of the input or internal wires.

The biggest drawback of using garbled circuit technology in SFE is the complexity associated with generating and computing garbled circuits by processors, such as servers, and transferring the input garblings. Evaluation of garbled circuits is linear in the size of the circuit, and requires on average four AES calls per gate. Further, circuit construction can require up to eight AES calls per gate. Communication between the servers consists primarily of sending garbled tables $T_i$ (four AES encryptions per each gate). Finally, transferring input garblings requires a small number (two or three) of public-key operations per input transferred.

Transfer of the garbled Circuit can be a costly communication expense for large functions. Additionally, computation of the garbled circuit, especially if done in bulk by the server for many clients, results in significant computational cost.

The complexity associated with using garbled circuit operations can be reduced by introducing a tamper-proof computing device (token) into the system. The token can be configured to generate the garbled circuit. Then, a first processor, such as server P1 does not have to generate and transmit the garbled circuit to a second processor, such as server P2. Instead, the server P1 can generate the token T and send it to server P2. T then generates and transmits the garbled circuit, where token T is synchronized with server P1. The synchronization of T with P1 can be achieved by embedding a secret key k in token T by server P1. Then, during the (execution of SFE), server P2 chooses an element x from the domain of the embedded in T pseudorandom function generator (PRFG) function F. Then T based on the randomness generates GC and outputs it to P2. This eliminates computation costs and complexity at the processor P1, encrypts the signal, but does not ensure that T is a trusted source for the information and can be trusted by P2.

Given this type of circuit, ie., a garbled circuit generated by a token T of the first processor P1, the second processor P2 may want to be protected from the misbehavior (or cheating) of the token T, i.e. incorrect generation of the GC.

One known way to protect P2 from T cheating is to have P1, or it's agent T, send more than one message to P2. For example, T could send 2 messages to P2. P2 chooses one message to be live and asks P1 to reveal the randomness used construction of all the other messages to see if the other messages are constructed properly. The probability that the live message was constructed properly is ½ in the case of 2 messages.

SUMMARY

An improved secure transaction system for facilitating secure transactions between devices in a network is set forth.

The system includes a first device. A secure agent, adapted for encrypting and delivering a message on behalf of the first device, is provided. The secure agent has a secret key drawn at random from a large domain embedded in the agent by the first device. A second device, adapted to obtain the message and a session ID from the secure agent, is provided. The second device can selectively test the correctness of generation of messages by the secure agent, by querying the first device. The testing is unknown and unpredictable to the secure agent during the transaction. In this manner, the first device and agent are kept separate to deter cheating.

A method for providing a secure SFE transaction is also set forth. The method includes the following steps. First, a secure token is generated. The secure token has an embedded PRFG key, the key having a large domain, the key being synchronized with a first processor. Next, an element is selected from a session id domain of the token with a second processor. A session ID is then generated based on the value of the element. A message is selectively received from the secure token with the second processor. A random string is selected by the second processor. The random string is sent to the first processor via the second processor. The string is then stored in the first processor. A live domain set and a test domain set are agreed upon by the first and second processors based on the random string selected by the second processor.

DESCRIPTION OF THE DRAWINGS

Features of example implementations of the invention will become apparent from the description, the claims, and the accompanying drawings in which:

DETAILED DESCRIPTION

Figure 1:
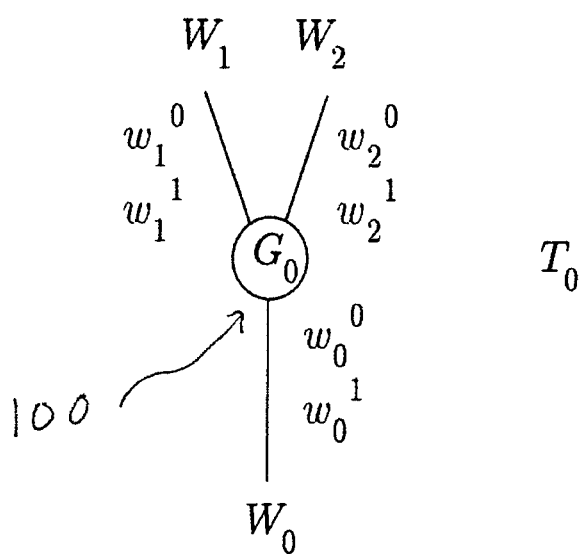
FIG. 1 is a diagram for a known garbled circuit 100.

An SFE system can generate messages using known secure algorithms, such as the garbled circuit 100 illustrated in FIG. 1 (Prior Art).

Figure 2:
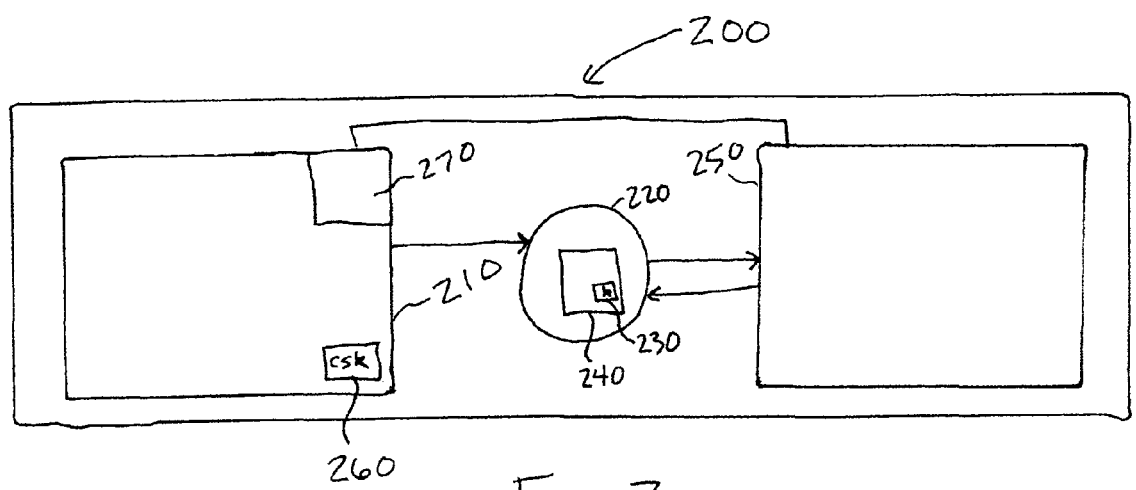
FIG. 2 is a block diagram depicting an exemplary arrangement 200 of an secure SFE system having a tamper-resistant token, and adapted to relay messages, such as the known garbled circuit of FIG. 1 via the tamper-resistant token.

FIG. 2 illustrates an exemplary embodiment for an improved secure transaction system 200 for facilitating secure transactions between devices in a network. The system 200 includes a first device 210. A secure agent 220, adapted for encrypting and delivering a message on behalf of the first device 210, is provided. The secure agent 220 has a secret key 230 drawn at random from a large domain 240 embedded in the agent 220 by the first device 210. A second device 250, adapted to obtain the message from the secure agent 220, and to give a session ID to the secure agent 220, is provided. The second device 250 can selectively test the correctness of message generation by the secure agent 220, by requesting a corresponding session key 260 from the first device 210, based on the session ID chosen by the second device 250. The testing is unknown and unpredictable to the secure agent 220 during the transaction. In this manner, the first device 210 and agent 220 are kept separate to deter cheating.

A storage device, such as memory 270 can be provided in operative communication with the first device 210. The storage device 270 can include, for example, databases generated by the first device 210 to track communications with the second device 250, agreed upon random strings sent to the first device 210 by the second device 250, or any other suitable data for facilitating SFE in the system 200.

The first and second devices 210, 250 can include any combination of suitable devices, such as servers, computers, cell phones, PDA's, or any other device suitable for facilitating SFE.

A suitable PRFG can be used by the secure agent 220 to generate and encrypt messages in the system 200. In accordance with the principles herein, for purposes of discussing PRFG capabilities herein, we will discuss the use of AES as our basic tool only because it is currently the most common PRFG, and because it satisfies the properties of a general pseudorandom generator. In one instance of the Advanced Encryption Standard (AES) algorithm, all domains are of a specified size, namely 128 bits. AES has two inputs, the key and the message. Thus, employing AES, for each secure agent 220 there are two distinct domains, where $2^{128}$ is the size of the domain.

The use of AES defines the domains of the system. First, there is a domain for the master and session keys. Next there is a domain for the messages and session IDs. Each of these domains must be large in order to prevent attacks. Also, by virtue of the domain being large, each agent can generate many messages.

Three possibilities can arise for the second device 250 regarding the use of the session ID it may generate. The second device 250 can do nothing with the session ID, or use the session ID for testing to see if the agent 220 is truthful in it's message, or the session ID can be used for live SFE.

There are also different ways to keep track of requests from the second device 250 to the first device 210 by the first device 210, or by a peripheral device in operative communication with the first device 210. One way involves keeping track of the requests by storing them, for example, in a memory 270 associated with or provided in the first device 210. If the client requests the session key 260 from the first device 210, then the first device 210 can add the session key 260 to a database in, for example, the memory 270. The first device 210 can maintain two databases in an associated memory, such as memory 270 given this scenario. First, the first device can maintain a database that records the session key if the session key has been opened by a request from the second device 250. Next, the first device must also maintain a database for session keys 260 that have been used for a live SFE.

Once the first device 210, the client, opens a session key 260, such as via an associated processor, or a server P1, or wherein the first device 210 itself is a processor or server, the key 260 can no longer be used for live SFE. Additionally, once an associated processor or server P2 to the second device 250, or wherein the second device 250 is itself a processor or server, the client, executes live SFE with the first device 210, or an associated processor, or server P1, the key 260 can no longer be opened.

The second device 250 can request the session key 260 by giving the session ID to the first device 210. Next, the first device 210 checks to see if it is ok to return the session key 260. It is ok for the first device 210 to return the session key 260 if the session key 260 is not a member of an execute live database contained, for example, in memory 270.

Alternatively, the first and second devices 210, 250, respectively, can agree on live and test domains. In this instance, the possibility of SFE replay could exist under some circumstances. Under these circumstances, a counter, such as counter 380 illustrated in FIG. 3, discussed below, can be maintained. The counter 380 can determine if the session ID (or a related value) is increasing, to make sure it is not repeating an earlier received session ID for SFE execution.

The agent 220 not only does not know if a domain is live or test, but the domains are completely unpredictable to the agent 220, as the agreement and content is directly between the first and second devices 210, 250, and is not shared with the agent 220.

Further, messages from the agent 220 can be sent in bulk by the second device 250 to the first device 210. Where a bulk message is sent, there is only one roundtrip communication required between the first and second devices 210, 250 respectively.

The system 200 is advantageous, in that the first device 210 can do the opening of the request from the second device 250, since he knows the session key 260 and the second device 250 sends him the session ID with his request. Separating of the first device 210 and the agent 220 plays an important role in deterring cheating. Specifically, when the agent 220 generates the message for the second device 250, he never knows when (or whether) this message will be opened. Further, the agent 220 is in possession of the second device 250, who can query it arbitrarily often without a strain on the second device 210 or the network. With the improvements set forth herein, opening consists of the second device 250 sending a short string to the first device 210. So, the first device 210, who ultimately determines the strategy of the agent 220 by programming it before giving it to the second device 250, is facing a probability of being caught being arbitrarily close to 1, if his agent 220 cheats.

This probability of being caught is in very significant contrast with standard prior art cut-and-choose techniques, where the execution environment and the protocol description prevent such an arbitrarily large deterrence factor. Specifically, in practice, due to overhead, the probability of catching with standard cut-and-choose is usually set to be only between ½ and ⅞.

Figure 3:
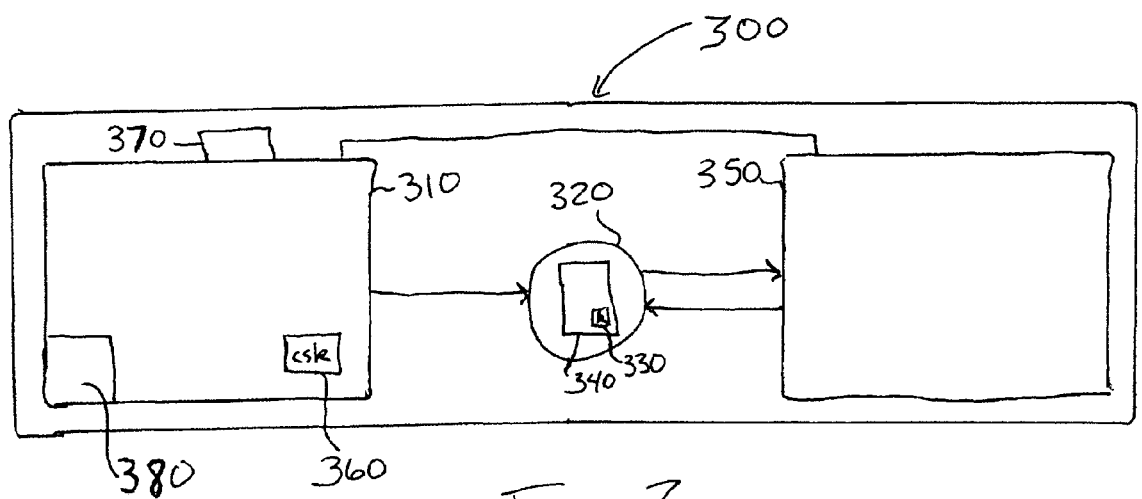
FIG. 3 is a block diagram depicting an exemplary arrangement 300 of a system constructed in accordance with the principles of the present invention.

In another exemplary embodiment illustrated in FIG. 3, a system 300 for employing a tamper-resistant token in SFE is set forth. The system 300 includes a first processor, or server, 310 adapted to generate and send at least one secure, or tamper-resistant, token 320 having an embedded secret master key 330. The embedded master key 330 is drawn at random from a large domain 340. The token 320 is capable of generating and sending messages upon receipt of a session ID. A second processor, or server, 350, adapted to send the session ID to the token and obtain the message sent by the token 320 after the token receives the session ID is also provided. The second processor 350 selectively requests a corresponding session key 360 from the first processor 310.

The large domain 340 can be further defined by a $2^{128}$ key domain used with, for example AES.

The token 320 discussed herein must be a tamper-resistant token. Tamper-resistant means that the memory of the token 320 cannot be viewed or discovered, and its memory cannot be modified. If the token 320 is not a tamper resistant token, then the client, or second server P1, can cheat.

The token 320 does not need to maintain a state (e.g. counters and other variables) between executions. Therefore the protocol of the invention is secure even if the token 320 can be "reset" by an attacker, such as the second processor 350. Reset means that the token's state is reset to the original state, provided in the beginning of the communication.

The corresponding session key 360 can be maintained in a database by the first processor 310 once the corresponding session key 360 has been requested from the first processor 310 by the second processor 350. The corresponding session key 360 can be used as a basis for SFE evaluation only if it is not a member of a database of the first processor 310.

The first and second processors 310, 350, respectively, can include any suitable devices, such as servers, computers, phones, associated devices, or any other devices suitable for SFE evaluation.

As discussed hereinabove with respect to FIG. 2, the corresponding session key 360 can be available for live evaluation if it has not yet been requested by the second processor 350 based on a random string stored in a memory 370 of the first processor 310.

The message can be a garbled circuit, such as the known exemplary garbled circuit 100 illustrated in FIG. 1, and is generated by the at least one secure token 320.

In another embodiment, a cost-effective system for producing an SFE transaction in a communications network is set forth. The system includes a first server adapted to generate a tamper-resistant token. The token has an embedded random key, drawn from a large domain. The key is synchronized, or equal, with the first server. The token is capable of generating and sending messages. A second server, adapted to receive the message from the token and select an element from the domain of a session ID of the token, is also provided. The second server can either selectively request a corresponding session key from the first server ("test" case), or execute a live SFE transaction ("live" case).

The first and second servers can agree to random live and test domains, respectively corresponding to the "live" case and the "test" case. The live and test domains are unknown and completely unpredictable to the token. The first and second servers randomly select and store a key which determines the live and test domains.

The first and second servers can agree to random live and test domains. The live and test domains are unknown and completely unpredictable to the token. The first and second servers randomly select and store a key which determines the live and test domains.

The first server can, upon request from the second server, compute the corresponding session key and send the corresponding session key back to the second server if the session ID is a member of the test domain.

The message can be a garbled circuit generated by the token, according to a garbled circuit generation algorithm.

In yet another embodiment, a method for providing a secure SFE transaction is set forth. The method includes the following steps. First, a first processor is used to generate a secure token. The secure token has an embedded master key drawn from a large domain. The token is capable of generating and sending a message. Next, the second processor is used to select an element from the domain of the session ID. A session key is then generated via the secure token, based on the master key and session ID. A session ID is generated for the second server using the element. The second processor is then used to selectively receive the message from the secure token. Finally, the session key can be selectively obtained by the second processor from the first processor, using the session ID, to verify the truth of the message generated and output by the token.

In still another embodiment, a secure SFE system is set forth. The system includes a first server P1. A second server P2 is also provided. The first server P1 is adapted to generate a secure token T. The secure token T contains both a circuit for generating an encrypted message from P1, and an embedded key having a large domain. The second server P2 can generate a session ID and selectively transmit the session ID.

P2 can selectively request, using the session ID, a corresponding session key from P1, and where T does not know if the corresponding session key is requested, such that T and P1 are separated to deter cheating.

In one more embodiment, a method for providing a secure SFE transaction is set forth. The method includes the following steps. First, a secure token is generated. The secure token has an embedded PRFG key, the key having a large domain, the key being synchronized with a first processor. Next, an element is selected from a session id domain of the token with a second processor. A session ID is then generated based on the value of the element. A message is selectively received from the secure token with the second processor. A random string is selected by the second processor. The random string is sent to the first processor via the second processor. The string is then stored in the first processor. A live domain set and a test domain set are agreed upon by the first and second processors based on the random string selected by the second processor.

The method can further include selectively requesting a corresponding session key from the first processor by the second processor based on the session ID.

Moreover the random string can be further defined by a 128 bit string, selected from an AES generator, wherein none of the test and live queries from the second processor need to be logged by the first processor.

The method can further include the step of selectively requesting bulk corresponding session keys from the first processor based on a number of messages received by the second processor.

The method can also include the step of maintaining a counter related to the session id submitted to the first server by the second server for live executions. The counter can determine if the session ID is always increasing, which would prevent replay. This is particularly important where multiple executions can occur with the same seed.

The method can be further defined by forming a test domain set and a live domain set as follows: using a pseudo-random permutation generator (PRPG), denoting by $D$ D the domain and key space of a PRPG $F$. F. $P\_2$A random string is chosen via the second processor $k\_D$ in_R D$ $k_D \in_R D$ to be the key of $F$ F. $k\_D$ $k_D$ is sent to the first processor via the second processor. Finally, the string is stored in the first processor, and the first and second processor agree to $P\_1$set $LIVE=\{F\_\{k\_D\}(x)|x$ in D, x mathrm{is even}\}$ LIVE=$\{F_{k_D}(x)|x \in D, x$ is even$\}$, and $TEST=\{F\_\{k\_D\}(x)|x$ in D, x mathrm{is odd}\}$ TEST=$\{F_{k_D}(x)|x \in D, x$ is odd$\}$, wherein $t$in TEST$ t$\in$TEST would not be accepted for execution by $P\_1$the first processor, and any element $e$ll in LIVE$ l$\in$LIVE would not be opened by $P\_1$the first processor, and wherein the first processor stores the key $k\_D$ $k_D$ such that the token $T$ T has no ability, in fact no predictability, to tell the domains $LIVE$ LIVE and $TEST$ TEST apart.

Further, the method can include multiple requests for corresponding session keys sent with the request to the first server to form a bulk corresponding session keys request, wherein the communication between the first server and the second server is reduced with bulk corresponding session keys request.

Yet another embodiment for a secure transaction system for facilitating secure transactions between devices in a network includes providing a first device. A secure agent, adapted for encrypting and delivering a message on behalf of the first device, is provided. The secure agent has a secret key drawn at random from a large domain embedded in the agent by the first device. A second device, adapted to obtain the message from the secure agent, is provided. The second device can selectively test the truth of a message obtained from the secure agent with session key obtained from the first device. The testing is unknown and unpredictable to the secure agent during the transaction.

The embodiments discussed herein relate to an SFE system and method, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the telecommunications arts, various signal leads, busses, data paths, data structures, channels, buffers, message-passing interfaces, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

However, one of skill in the art will appreciate that the teachings of the present application could be applied to other types of wireless networks (perhaps with modifications within the ken of a skilled artisan) without departing from the spirit of the present invention.

Specifically, a novel system and method of secure SFE with minimal costs could be provided in a variety of communication environments without departing from the spirit of the invention. For instance, the steps may be performed in a differing order, or steps may be added, deleted, or modified. Further, signaling and media layers could be bound to an internal subscriber network without departing from the principles described herein The embodiments described herein are exemplary. Thus it will be appreciated that although the embodiments are described in terms of specific technologies, other equivalent technologies could be used to implement systems in keeping with the spirit of the present invention.

The method set forth herein can include computer readable storage medium storing instructions which, when executed on a programmed processor achieve the novel protocol.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A system for producing a Secure Function Evaluation (SFE) transaction in a communications network comprising:
   a first server comprising a processing device;
   the first server configured to generate a secure token, the secure token having an embedded random key drawn from a domain, the embedded random key being synchronized, or equal, with the first server, and the secure token configured to generate and send a message to a second server, so as to achieve a secure transaction,
   wherein the first server is further configured to receive from the second server a request for a session key and to execute a live SFE transaction, so as to achieve a secure transaction,
   wherein the first server agrees to random live and test domains,
   wherein the random live and test domains are unknown and unpredictable to the secure token, and wherein the first server is further configured to randomly select and store a key on which the random live and test domains are based.

2. A system as claimed in claim 1, wherein the first server, upon request from the second server computes the session key and sends the session key back to the second server if the session ID is a member of the test domain.

3. A system as claimed in claim 1, wherein the message is a garbled circuit generated by the secure token, according to a garbled circuit generation algorithm.

4. The system of claim 1, wherein the domain is a $2^{128}$ key domain used with Advanced Encryption Standard (AES).

5. The system of claim 4, wherein the domain is used with Advanced Encryption Standard (AES).

6. A method for providing a Secure Function Evaluation (SFE) transaction comprising the steps of:
   a) generating a secure token having an embedded pseudorandom function generator key, the embedded pseudorandom function generator key having a domain, the embedded pseudorandom function generator key being synchronized with a first processor, so as to achieve a secure transaction;
   b) receiving a random string by the first processor from a second processor, so as to achieve a secure transaction;
   c) forming a live domain set and a test domain set based on the random string, so as to achieve a secure transaction; and
   d) storing the random string in the first processor, so as to achieve a secure transaction, wherein the first processor agrees to random live and test domains,
wherein the random live and test domains are unknown and unpredictable to the secure token, and
wherein the first server randomly selects and stores a key which determines the random live and test domains.

7. A method as claimed in claim 6, further comprising the step of e) selectively requesting a session key from the first processor by the second processor based on the session ID, so as to achieve a secure transaction.

8. A method as claimed in claim 7, further comprising the step of:
   f) selectively requesting bulk session keys from the first processor based on a number of messages received by the second processor, so as to achieve a secure transaction.

9. A method as claimed in claim 7, further comprising the step of:
   f) maintaining a counter, related to the session ID submitted to the first processor by the second processor, for live executions, so as to achieve a secure transaction.

10. A method as claimed in claim 7, further comprising the step of:
    f) selectively requesting bulk session keys from the first processor based on a number of messages received by the second processor, so as to achieve a secure transaction.

11. The method of claim 6, wherein the domain is a $2^{128}$ key domain used with Advanced Encryption Standard (AES).

* * * * *